US010779680B2

(12) United States Patent
Jordan

(10) Patent No.: US 10,779,680 B2
(45) Date of Patent: Sep. 22, 2020

(54) ROTISSERIE GRILL COOKER

(71) Applicant: Kenneth Ellis Jordan, Cooker, AL (US)

(72) Inventor: Kenneth Ellis Jordan, Cooker, AL (US)

( * ) Notice: Subject to any disclaimer, the term of this patent is extended or adjusted under 35 U.S.C. 154(b) by 127 days.

(21) Appl. No.: 16/031,631

(22) Filed: Jul. 10, 2018

(65) Prior Publication Data

US 2019/0014945 A1    Jan. 17, 2019

Related U.S. Application Data

(60) Provisional application No. 62/531,783, filed on Jul. 12, 2017.

(51) Int. Cl.
*A47J 37/07* (2006.01)
*A47J 37/04* (2006.01)

(52) U.S. Cl.
CPC .......... *A47J 37/043* (2013.01); *A47J 37/047* (2013.01); *A47J 37/0745* (2013.01); *A47J 2037/0795* (2013.01)

(58) Field of Classification Search
CPC .............. A47J 37/0745; A47J 37/0704; A47J 2037/0795; A47J 33/00
USPC .............. 99/393, 396, 449, 450; 126/29, 30, 126/25 AA, 25 A, 25 R
See application file for complete search history.

(56) References Cited

U.S. PATENT DOCUMENTS

| | | | | |
|---|---|---|---|---|
| 4,065,085 A * | 12/1977 | Gellatly | ................... | A47J 33/00 248/124.1 |
| 4,363,313 A * | 12/1982 | Smith | ................. | A47J 37/0763 126/9 R |
| 4,829,977 A * | 5/1989 | Valentine | .................. | F24C 1/16 126/25 A |
| 5,297,534 A * | 3/1994 | Louden | ............... | A47J 37/0763 126/25 A |
| 5,908,026 A * | 6/1999 | Forst | .................... | A47J 37/0763 126/25 AA |
| 5,944,009 A * | 8/1999 | Scheller | ................... | A47J 33/00 126/25 R |

FOREIGN PATENT DOCUMENTS

WO    WO-2006083705 A2 *   8/2006    .............. F24B 1/205

* cited by examiner

*Primary Examiner* — Reginald Alexander

(57) ABSTRACT

A rotisserie grill cooker has a base, a support post, a cantilevered rail, a cage-drive assembly, and a firepit. Together these enable a user to suspend a rotating food rack over a heat source. Specifically, the base is a rigid structure to which one end of the support post is pivotably connected. The cantilevered rail extends away from the support post over the heat source. The cantilevered rail is positioned offset from the base along the support post, so the food rack can be suspended in between the cantilevered rail and the firepit that traverses through the base. The cage-drive assembly is a motorized support system, is slidably engaged along the cantilevered rail, and rotates the food rack. The support assembly has a carriage that is connected in between a drive system and the cantilevered rail. The heat source is within the firepit and heats the food rack.

16 Claims, 9 Drawing Sheets

ROTISSERIE GRILL COOKER

The current application claims a priority to the U.S. Provisional Patent application Ser. No. 63/531,783 filed on Jul. 12, 2017.

FIELD OF THE INVENTION

The present invention relates generally to a grilling system. More particularly, the present invention relates to a horizontal rotisserie, a support structure, a basket and frame, that are used to suspend a rotating food rack over a heat source.

BACKGROUND OF THE INVENTION

Rotisserie cooking systems frequently feature motors that rotate food around a horizontal axis. The present invention is able to cook large quantities of meat with little user interaction needed for flipping. The present invention is a system that can be used in conjunction with, or independently of, traditional cooking systems. Specifically, the present invention is designed to rotate a food rack around a vertical axis while suspended over a heat source. Thus, preventing the food from burning and providing an evenly cooked meal. Additionally, the present invention is designed to function as a robust cooking apparatus capable of cooking large quantities of food at once.

DETAIL DESCRIPTIONS OF THE INVENTION

Figure 1:
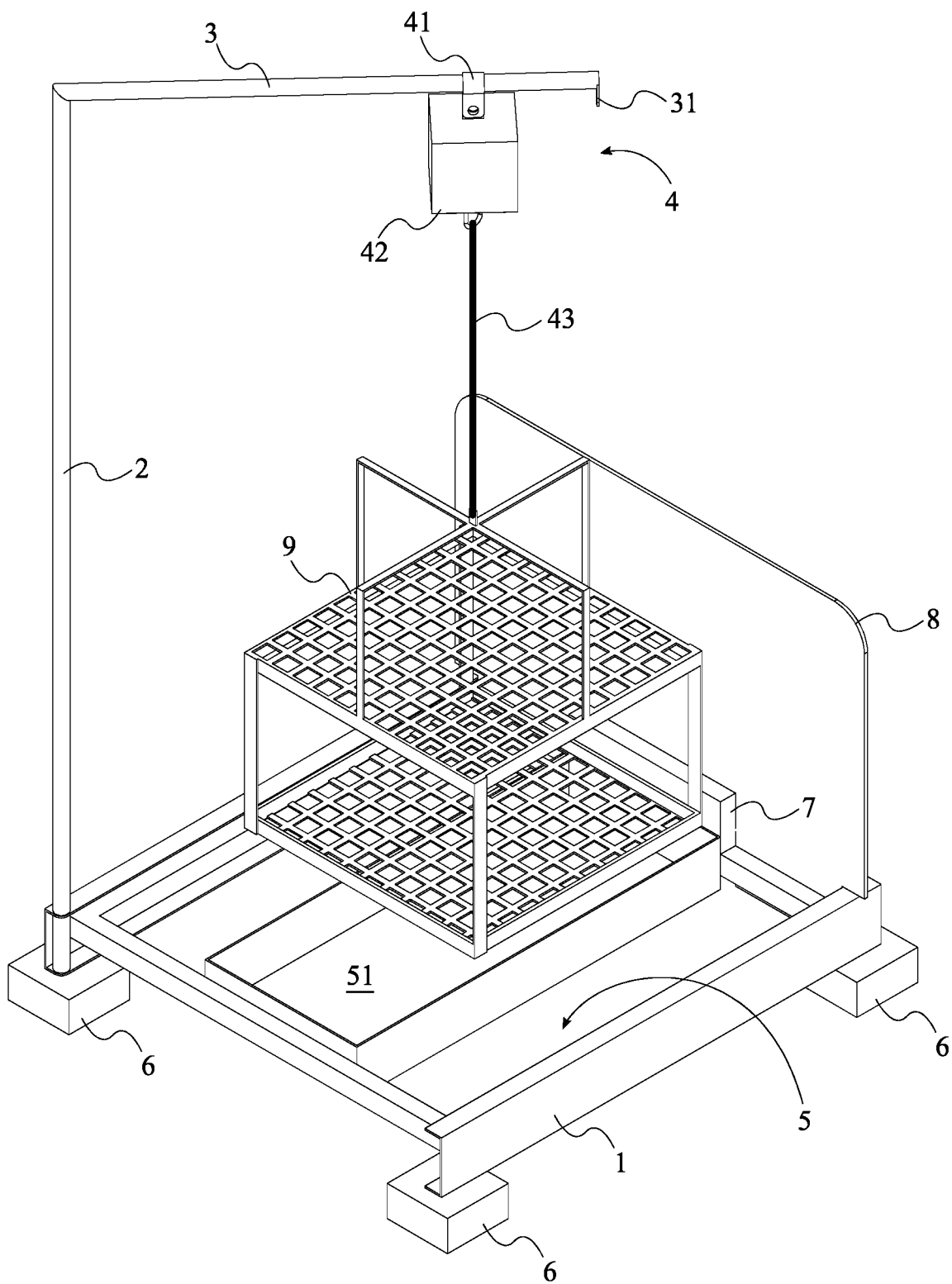
FIG. 1 is an isometric perspective view of the present invention.

All illustrations of the drawings are for the purpose of describing selected versions of the present invention and are not intended to limit the scope of the present invention.

In reference to FIG. 1 through FIG. 9, the present invention, the rotisserie grill cooker, is a cooking apparatus that is used to rotate a suspended food rack over a heat source. The term heat source is used herein to refer to grilling apparatus including, but not limited to, gas, electric, or charcoal cooking systems. The present invention combines a firepit with a support frame and a cantilevered arm to support a food rack that rotates over the heat source during grilling. The rotation of the food rack is used to prevent food placed on the food rack from becoming burned. To achieve this functionality, the present invention comprises a base 1, a support post 2, a cantilevered rail 3, a cage-drive assembly 4, and a firepit 5. The base 1 is terminally connected to the support post 2 so that the base 1 is able to maintain the support post 2 in a position that facilitates loading, unloading, and grilling with the food cage. Additionally, the support post 2 is pivotably connected to the base 1. Accordingly, a user is able to rotate the support post 2 when positioning the food rack food over the heat source. The support post 2 is terminally connected to the cantilevered rail 3. Further, the cantilevered rail 3 is positioned offset from the base 1 along the support post 2. As a result, the cantilevered rail 3 is able to act as a positioning arm that holds the food rack, once attached, in a desired position. Specifically, the user is able to rotate the attached food rack closer to, or further away from, the heat source by rotating the support post 2. In a first alternative embodiment, the cantilevered rail 3 is slidably engaged along the support post 2 so that the user is able to increase or decrease the distance between the cantilevered rail 3 and the base 1.

In reference to FIG. 1, the cage-drive assembly 4 is a motorized system that enables the user to rotate the attached food rack at a desired speed. To achieve this, the cage-drive assembly 4 comprises a carriage 41 and a drive system 42. The drive system 42 is the motor used to automatically rotate the food rack. The carriage 41 is slidably engaged along the cantilevered rail 3. Further, the carriage 41 is laterally attached to the drive system 42. Accordingly, the drive system 42 can be repositioned along the length of the cantilevered rail 3. Additionally, the drive system 42 is positioned in between the base 1 and the cantilevered rail 3. Thus positioned, the drive system 42 is able to suspend the food rack over the heat source while cooking. Preferably, the drive system 42 is used to rotate the food rack around a vertical axis. In a first alternative embodiment, the drive system 42 is designed to lift and lower the attached food rack. Further, the drive system 42 can be communicably coupled to a controller that enables the user to remotely control the operation of the present invention. Relatedly, the drive system 42 may include integrated, removable, or rechargeable power supplies. The firepit 5 normally traverses through the base 1. As a result, charcoal and other flammable materials can be ignited within the firepit 5 to form the heat source that is used to cook the food on the food rack. Additionally, the firepit 5 prevents flammable materials from spilling into the surrounding environment. Preferably, the firepit 5 is designed with airflow channels that enable the heat source to reach temperatures capable of roasting food.

Figure 2:
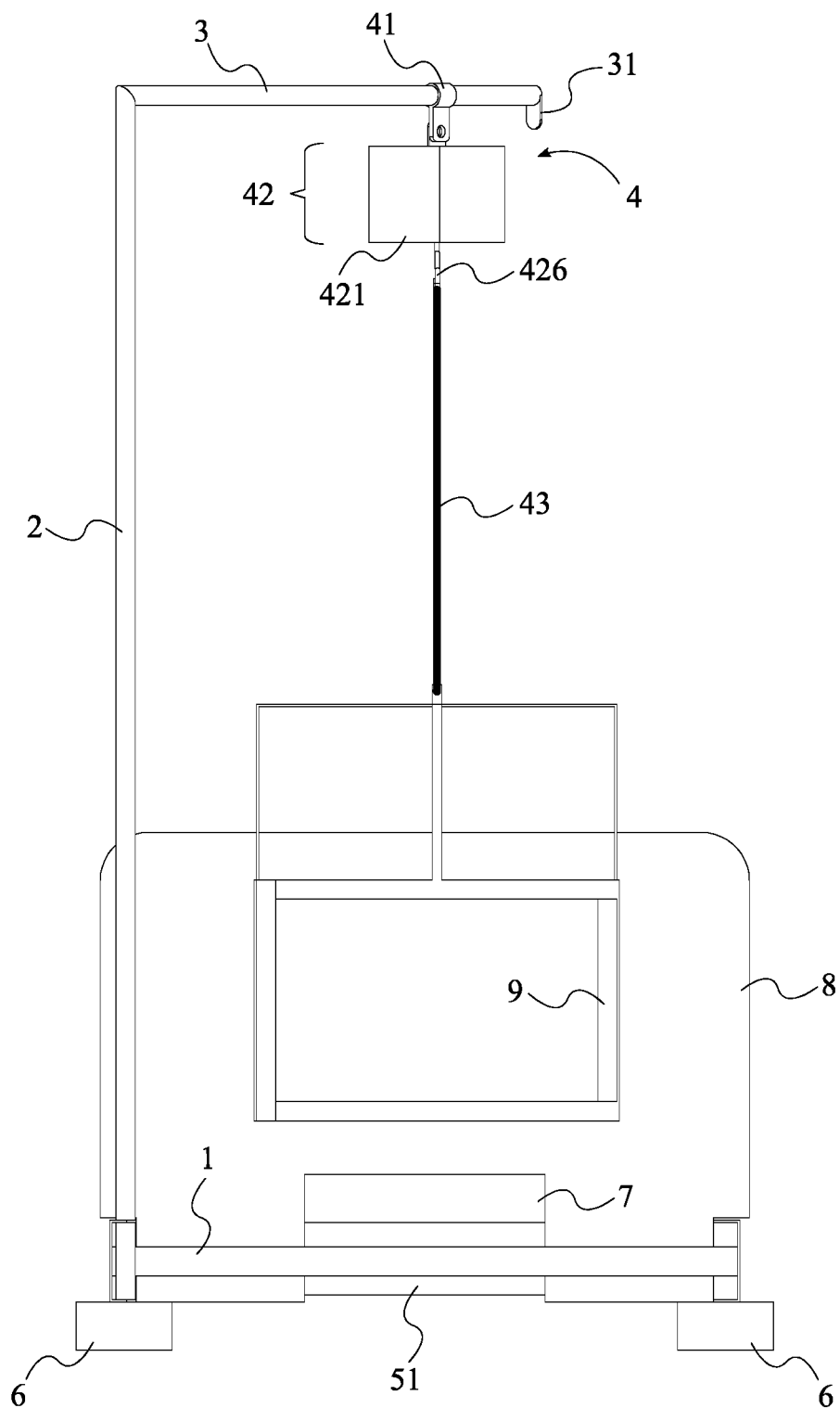
FIG. 2 is a front view of the present invention.

In reference to FIG. 1 and FIG. 2, the first alternative embodiment of the present invention makes use of a firepit 5 with a closed bottom. Specifically, the first alternative embodiment comprises a charcoal trough 51. The charcoal trough 51 is preferably constructed from fireproof materials. Additionally, the charcoal trough 51 is mounted onto the base 1 and is positioned within the firepit 5. Thus positioned, the charcoal trough 51 acts as a container for the heat source. To better protect the surrounding environment from fire damage, the present invention comprises a plurality of risers 6. The plurality of risers 6 is adjacently connected to the base 1. Additionally, the plurality of risers 6 is distributed across the base 1. Further, the base 1 is positioned in between the support post 2 and the plurality of risers 6. As a result, the plurality of risers 6 lifts the base 1 away from the ground. Thus, providing openings for air to flow into the firepit 5. Alternatively, the plurality of risers 6 protects the surrounding area from being burned while the charcoal trough 51 is being used.

Figure 5:
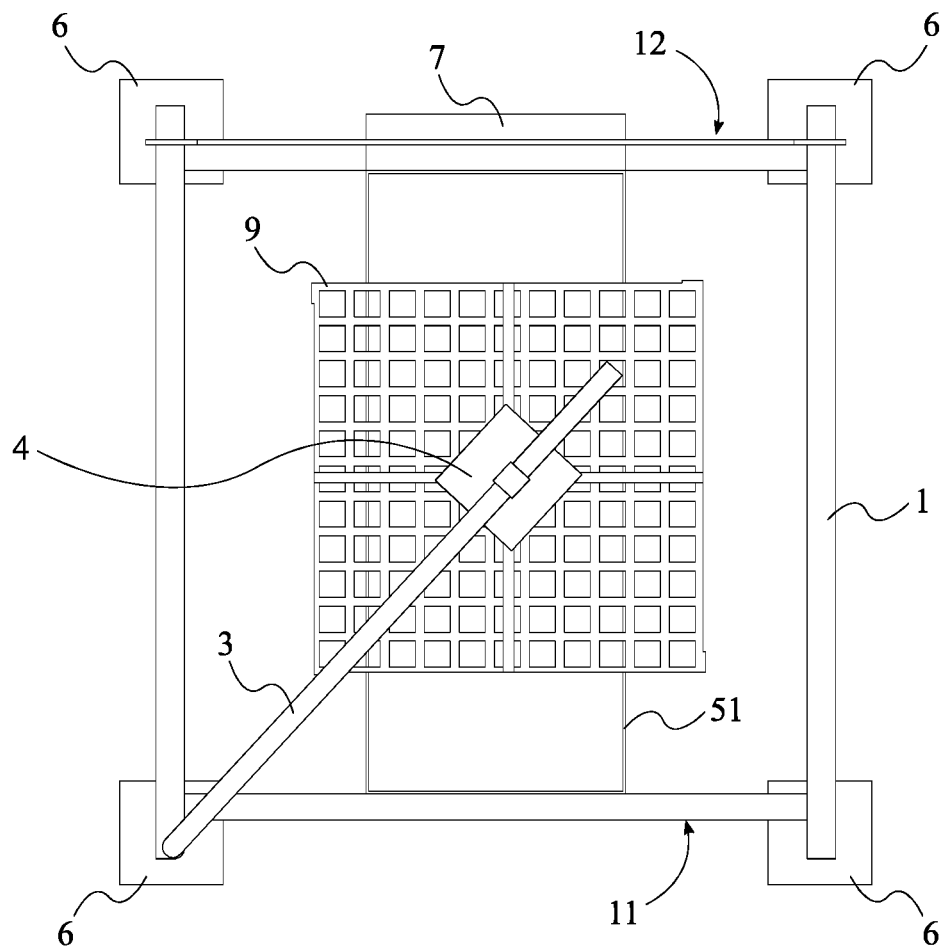
FIG. 5 is a right-side view of the present invention.
Figure 6:
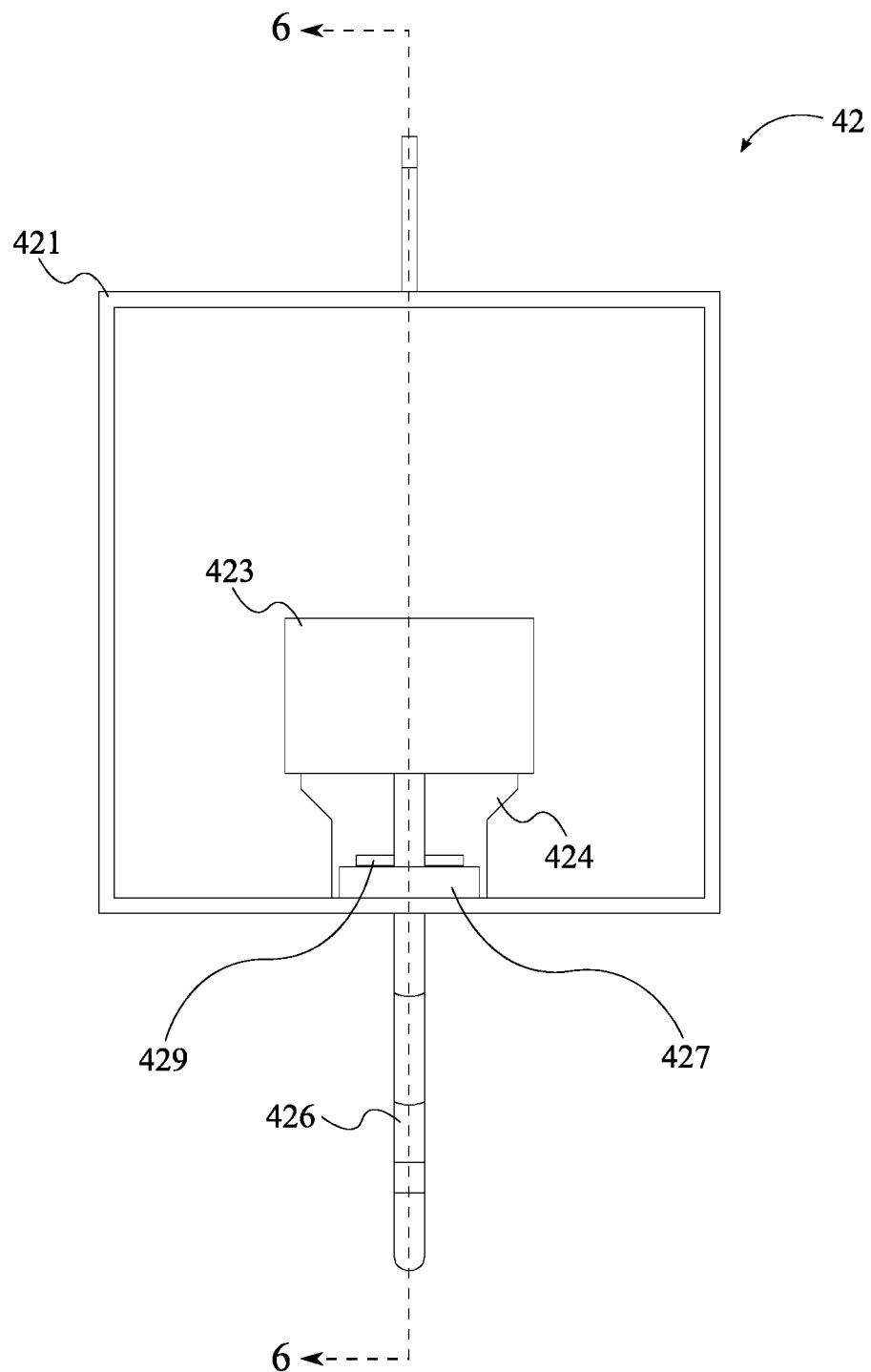
FIG. 6 is a front view of the drive system used in the present invention.

In reference to FIG. 1 and FIG. 5, the present invention is designed to enable the user to prepare food over the heat source in a controlled and consistent manner. To facilitate this, the present invention further comprises a panel brace 7 and a back panel 8. Additionally, the base 1 further comprises a first widthwise edge 11 and a second widthwise edge 12. The first widthwise edge 11 is positioned opposite to the second widthwise edge 12 across the base 1. Accordingly, the base 1 is designed as a rectangular structure onto which various components can be mounted. Specifically, the support post 2 is positioned adjacent to the first widthwise edge 11. Additionally, the panel brace 7 is mounted onto the base 1. Further, the panel brace 7 is positioned adjacent to the first widthwise edge 11. Thus positioned, the panel brace 7 is able to maintain the back panel 8 in a position that facilitates cooking food. Specifically, the back panel 8 is mounted onto the panel brace 7 so that the back panel 8 is able to act as a wind protector for the heat source. Further, the back panel 8 acts as a backsplash to shield the surrounding area from fluids that are expelled during the cooking process.

Figure 3:
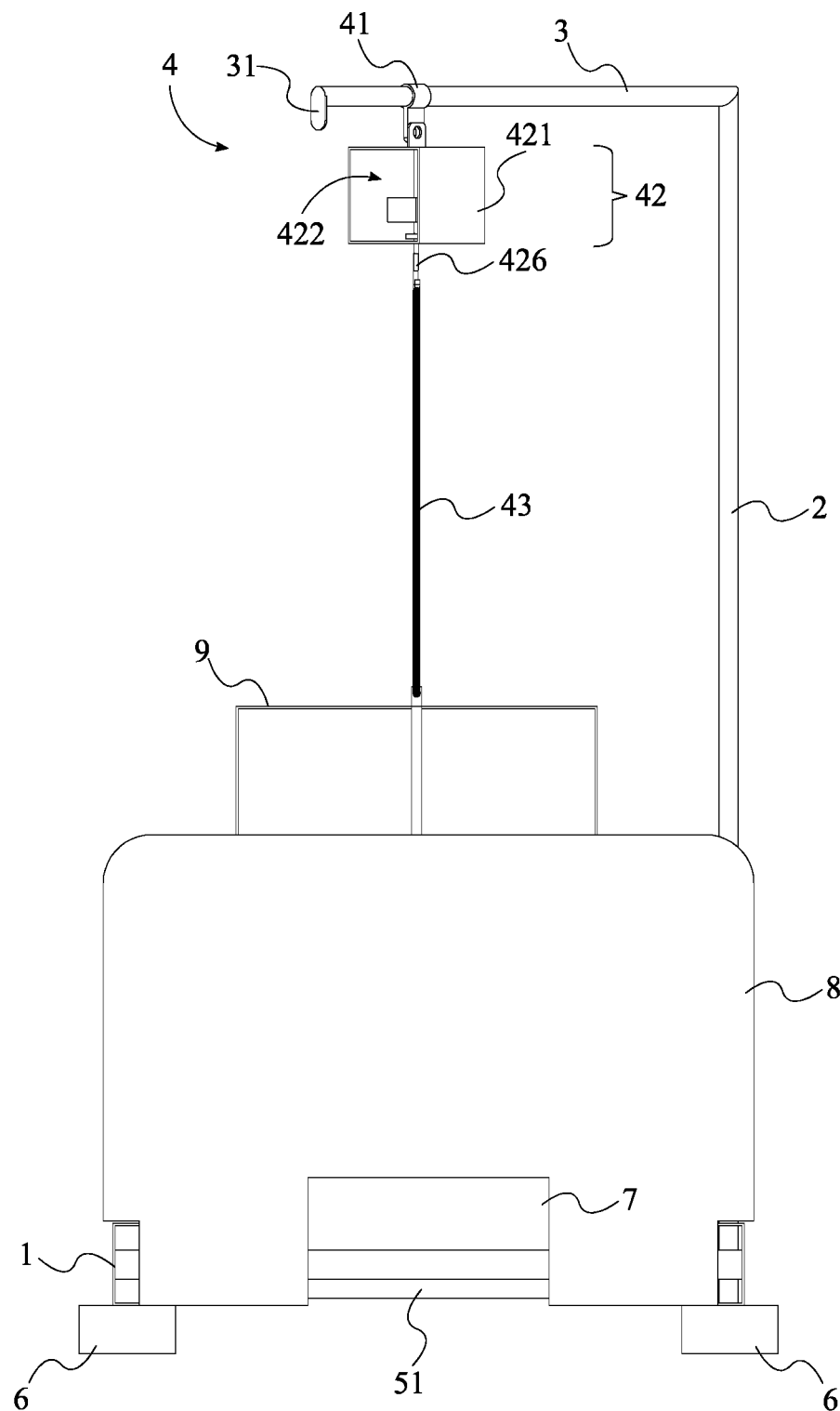
FIG. 3 is a rear view of the present invention.
Figure 4:
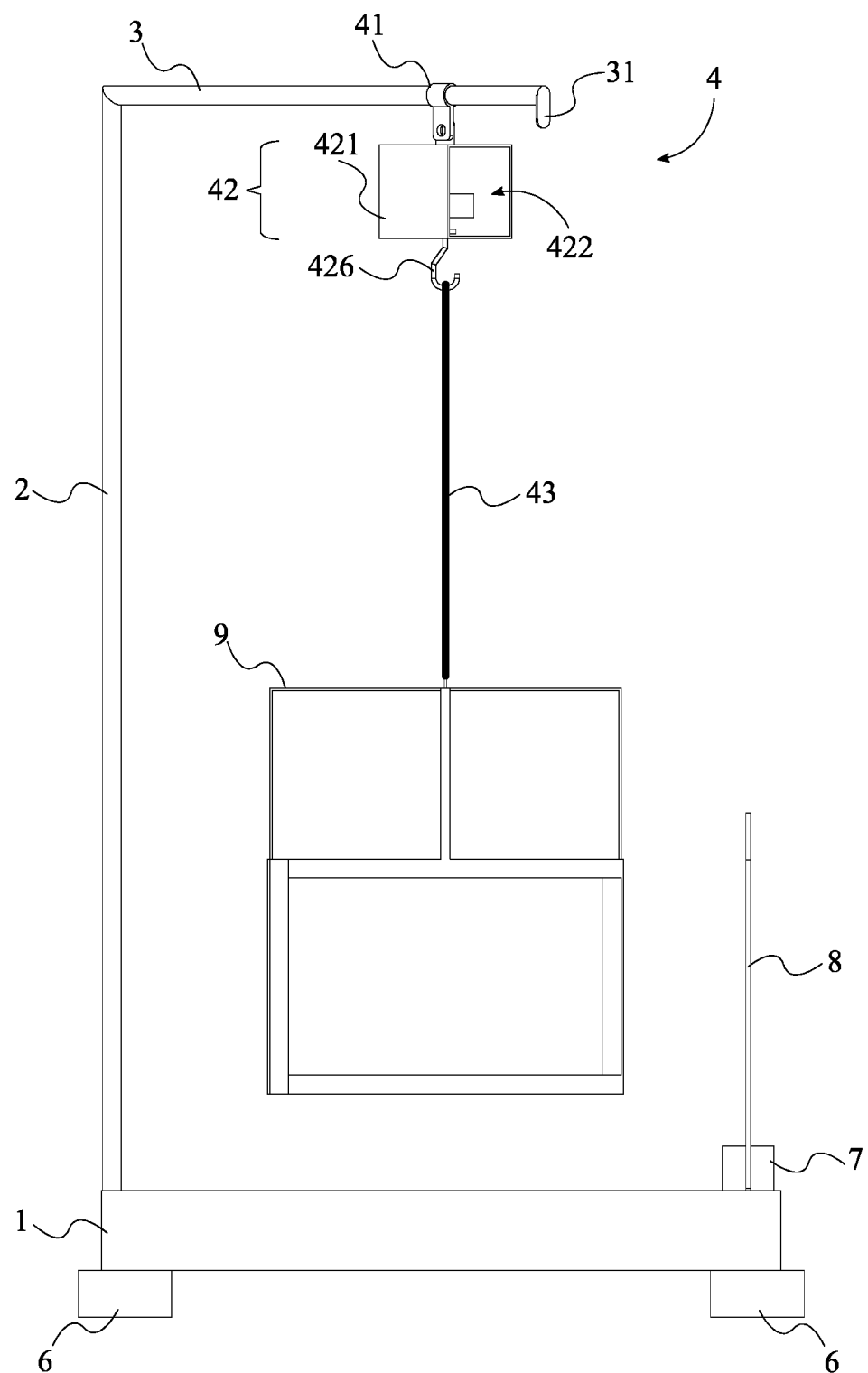
FIG. 4 is a right-side view of the present invention.

In reference to FIG. 1 and FIG. 3, the present invention is designed to be a system that enables the user to easily position food during the cooking process. To that end, the present invention further comprises a stopper 31. The stopper 31 is terminally connected to the cantilevered rail 3, opposite to the support post 2. Further, he carriage 41 is positioned in between the support post 2 and the stopper 31. As a result, the stopper 31 prevents the carriage 41 from running off the cantilevered rail 3.

In reference to FIG. 1 and FIG. 6 through FIG. 9, the present invention is designed such that the drive system 42 can be disassembled and modified as desired. To that end, the drive system 42 further comprises a housing 421, a drive receptacle 422, a motor 423, a mounting hole 245, and a hook 426. The housing 421 is a connective enclosure that supports the remaining components of the drive system 42 while enabling the user to access these components. Specifically, the housing 421 is pivotably attached to the carriage 41 so that the housing 421 can be reoriented as desired. Additionally, the housing 421 is able to transfer the weight of the food rack to the carriage 41. This weight is then transferred to the cantilevered rail 3, the support post 2, and ultimately the base 1. The drive receptacle 422 normally traverses into the housing 421 to create an open-faced enclosure that can be accessed by the user. The motor 423 is mounted within the drive receptacle 422. As a result, the motor 423 is partially shielded from the external environment while still being accessible by the user. The mounting hole 245 normally traverses through the housing 421 into the drive receptacle 422 so that the hook 426 may be passed into the drive receptacle 422. Specifically, a linear end 4261 of the hook 426 engages into the mounting hole 245. Additionally, the linear end 4261 is operatively coupled to the motor 423, so that the motor 423 rotates the hook 426. As a result, the hook 426 is able to rotate freely while under the influence of the motor 423. Further, the rotation of the hook 426 is transferred to the attached food rack. Thus, rotating the food rack and preventing food from being burned by the heat source.

In reference to FIG. 6 through FIG. 9, the present invention is designed to enable the user to access the area around the attachment point between the hook 426 and the motor 423. To that end, the drive system 42 further comprises a motor-support bracket 424. The motor-support bracket 424 is a rigid member used to maintain the motor 423 in a position that facilitates rotating the hook 426. Specifically, the motor-support bracket 424 is connected in between the motor 423 and the housing 421. Thus positioned, the motor-support bracket 424 delineates a compartment where the user can access the connection point between the hook 426 and the motor 423. That is, the present invention is designed to enable the user to selectively couple or decouple the hook 426 and the motor 423. Therefore, the motor-support bracket 424 creates a compartment that is sufficiently large for the user's hands to disconnect the hook 426 from the motor 423.

Figure 7:
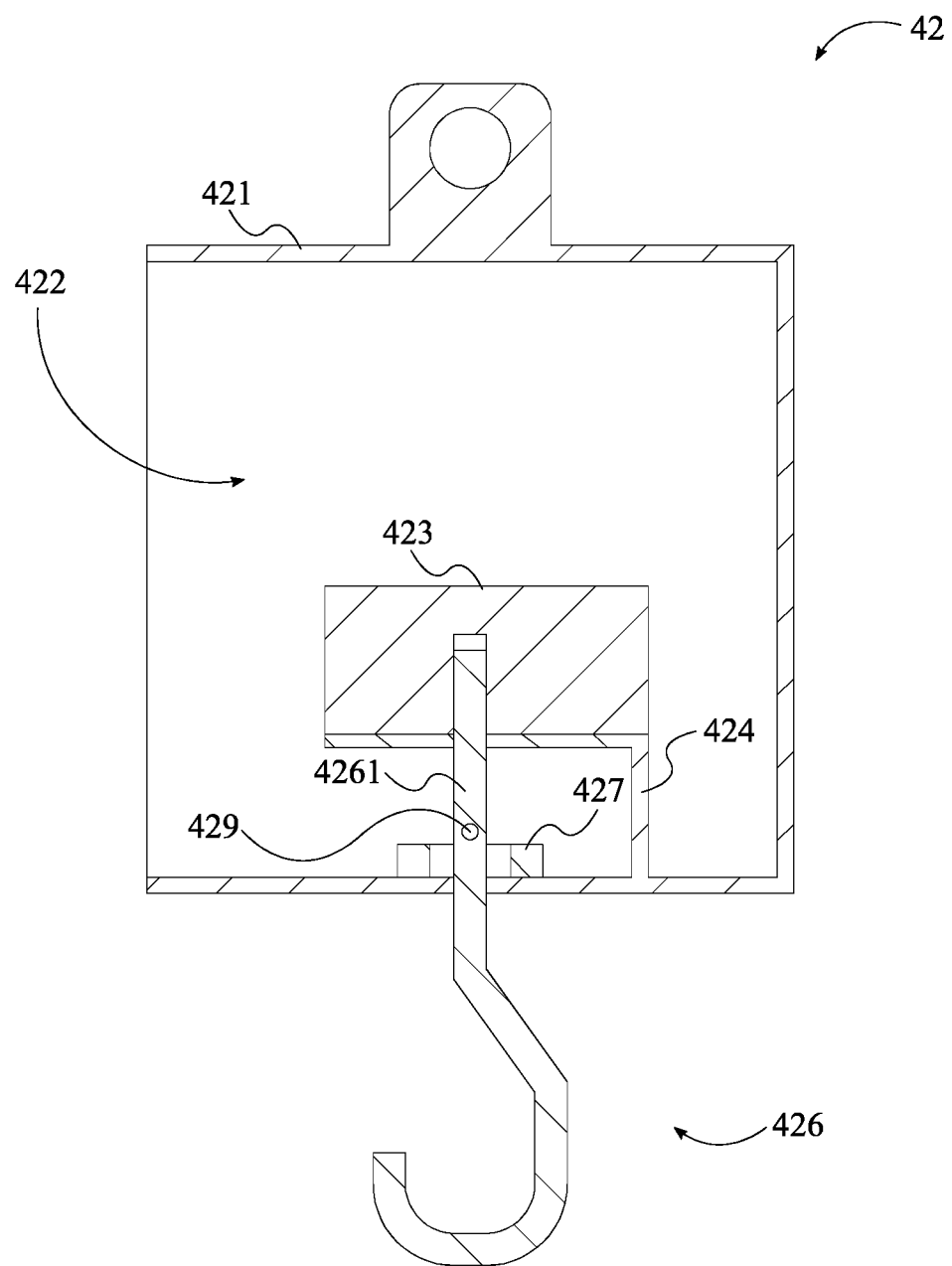
FIG. 7 is a sectional view of the drive system of view of the present invention taken along line 7-7 in FIG. 6.
Figure 8:
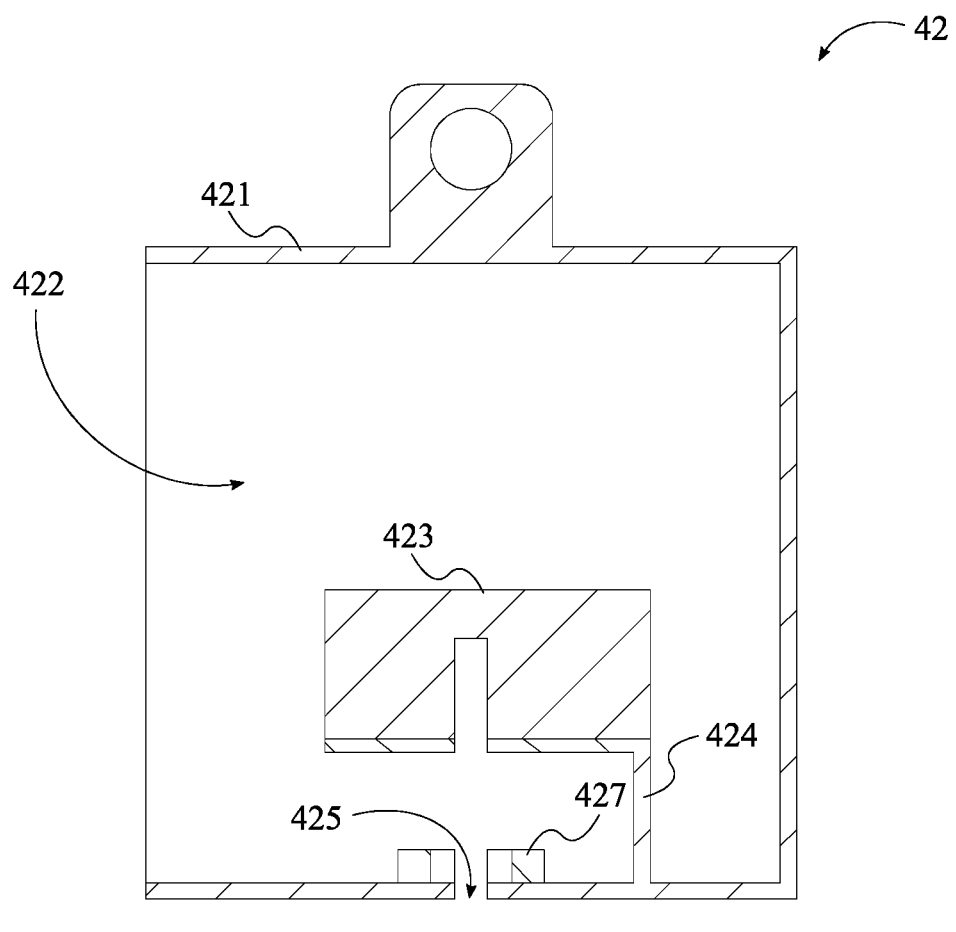
FIG. 8 is a sectional view of the drive system of view of the present invention taken along line 7-7 in FIG. 6. In this view the hook is removed
Figure 9:
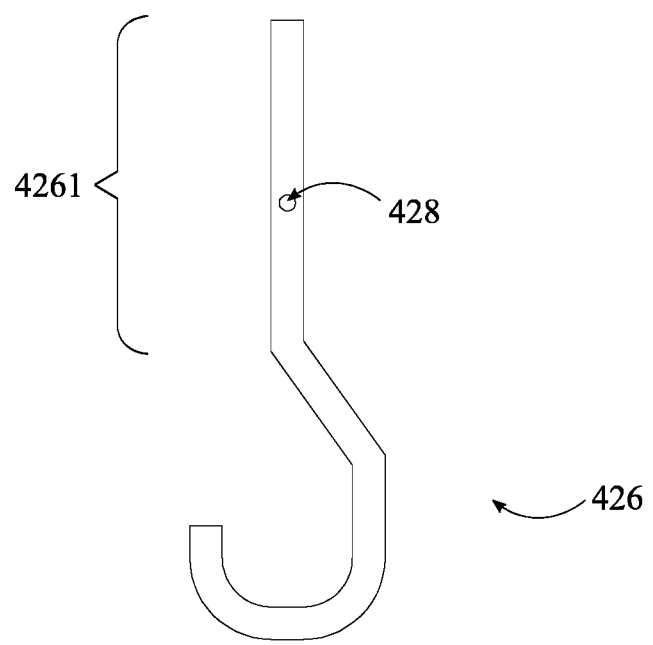
FIG. 9 is a right-side view of the hook used in the present invention.

In reference to FIG. 7 and FIG. 9, the present invention is designed with an annular bearing system to support the weight of the food rack while reducing frictional forces that counteract the rotational force generated by the motor 423. To that end, the drive system 42 further comprises an annular support bearing 427, a pinhole 428, and a lynchpin 429. The annular support bearing 427 is a ring-shaped friction-reducer that is designed to be inserted in between two components. Thus inserted, the annular support bearing 427 functions as a mechanical means for reducing rotational friction between the two components. To that end, the annular support bearing 427 is perimetrically mounted around the mounting hole 245. Additionally, the annular support bearing 427 is positioned in between the housing 421 and the motor 423. As a result, the annular support bearing 427 acts as a friction-reducing element that enables the hook 426 to support the weight of the food rack while rotating under the influence of the motor 423. The present invention is designed to use the lynchpin 429 to transfer the weight of the food rack to the annular support bearing 427 and the housing 421. To accomplish this, the linear end 4261 of the hook 426 is rotatably engaged through the annular support bearing 427. Additionally, the pinhole 428 normally traverses through the linear end 4261. Further, the lynchpin 429 engages into the pinhole 428, and the lynchpin 429 is positioned in between the annular support bearing 427 and the motor 423. Accordingly, the lynchpin 429 rests on the annular support bearing 427 while the hook 426 is coupled to the motor 423. Thus, the annular support bearing 427 is able to reduce friction that would otherwise impede the rotation of the food rack. Further, the lynchpin 429 prevents linear displacement of the hook 426 relative to the annular support bearing 427, while engaged into the pinhole 428. As described above, the present invention is designed to enable the user to selectively couple and decouple the hook 426 and motor 423. To accomplish this, the use is able to pull the lynchpin 429 out of the pinhole 428. In the preferred embodiment of the present invention the food rack is a grilling cage 9. The present invention further comprises a support cable. The support cable is connected in between the grilling cage 9 and the hook 426. Accordingly, the support cable tethers the grilling cage 9 to the hook 426 and enables the grilling cage 9 to be suspended over the heat source.

Although the invention has been explained in relation to its preferred embodiment, it is to be understood that many other possible modifications and variations can be made without departing from the spirit and scope of the invention as hereinafter claimed.

What is claimed is:
1. A rotisserie grill cooker comprising:
a base;
a support post;
a cantilevered rail;
a cage-drive assembly;
a firepit;
the cage-drive assembly comprising a carriage and a drive system;
the base being terminally connected to the support post;
the support post being pivotably connected to the base;
the support post being terminally connected to the cantilevered rail;
the cantilevered rail being positioned offset from the base along the support post;

the carriage being slidably engaged along the cantilevered rail;

the carriage being laterally attached to the drive system;

the drive system being positioned in between the base and the cantilevered rail;

the firepit normally traversing through the base;

a plurality of risers;

the plurality of risers being adjacently connected to the base;

the plurality of risers being distributed across the base; and the base being positioned in between the support post and the plurality of risers.

2. The rotisserie grill cooker as claimed in claim 1 comprising:

a charcoal trough;

the charcoal trough being mounted onto the base; and the charcoal trough being positioned within the firepit.

3. The rotisserie grill cooker as claimed in claim 1 comprising:

a panel brace;

a back panel;

the base further comprising a first widthwise edge and a second widthwise edge;

the first widthwise edge being positioned opposite to the second widthwise edge across the base;

the support post being positioned adjacent to the first widthwise edge;

the panel brace being mounted onto the base;

the panel brace being positioned adjacent to the first widthwise edge; and the back panel being mounted onto the panel brace.

4. The rotisserie grill cooker as claimed in claim 1 comprising:

a stopper;

the stopper being terminally connected to the cantilevered rail, opposite to the support post; and the carriage being positioned in between the support post and the stopper.

5. The rotisserie grill cooker as claimed in claim 1 comprising:

the drive system further comprising a housing, a drive receptacle, a motor, a mounting hole, and a hook;

the housing being pivotably attached to the carriage;

the drive receptacle normally traversing into the housing;

the motor being mounted within the drive receptacle;

the mounting hole normally traversing through the housing into the drive receptacle;

a linear end of the hook engaging into the mounting hole; and the linear end being operatively coupled to the motor, wherein the motor rotates the hook.

6. The rotisserie grill cooker as claimed in claim 5 comprising:

the drive system further comprising a motor-support bracket; and the motor-support bracket being connected in between the motor and the housing.

7. The rotisserie grill cooker as claimed in claim 5 comprising:

the drive system further comprising an annular support bearing, a pinhole, and a lynchpin;

the annular support bearing being perimetrically mounted around the mounting hole;

the annular support bearing being positioned in between the housing and the motor;

the linear end being rotatably engaged through the annular support bearing;

the pinhole normally traversing through the linear end;

the lynchpin engaging into the pinhole; and the lynchpin being positioned in between the annular support bearing and the motor.

8. The rotisserie grill cooker as claimed in claim 1 comprising:

a grilling cage;

a support cable;

the drive assembly further comprises a hook; and the support cable being connected in between the grilling cage and the hook.

9. A grilling hoist comprising:

a base;

a support post;

a cantilevered rail;

a cage-drive assembly;

a firepit;

a panel brace;

a back panel;

the cage-drive assembly comprising a carriage and a drive system;

the first widthwise edge being positioned opposite to the second widthwise edge across the base;

the base being terminally connected to the support post;

the support post being pivotably connected to the base;

the support post being terminally connected to the cantilevered rail;

the cantilevered rail being positioned offset from the base along the support post;

the carriage being slidably engaged along the cantilevered rail;

the carriage being laterally attached to the drive system;

the drive system being positioned in between the base and the cantilevered rail;

the firepit normally traversing through the base;

the first widthwise edge being positioned opposite to the second widthwise edge across the base;

the support post being positioned adjacent to the first widthwise edge;

the panel brace being mounted onto the base;

the panel brace being positioned adjacent to the first widthwise edge; and the back panel being mounted onto the panel brace.

10. The grilling hoist as claimed in claim 9 comprising:

a charcoal trough;

the charcoal trough being mounted onto the base; and the charcoal trough being positioned within the firepit.

11. The grilling hoist as claimed in claim 9 comprising:

a plurality of risers;

the plurality of risers being adjacently connected to the base;

the plurality of risers being distributed across the base; and the base being positioned in between the support post and the plurality of risers.

12. The grilling hoist as claimed in claim 9 comprising:

a stopper;

the stopper being terminally connected to the cantilevered rail, opposite to the support post; and the carriage being positioned in between the support post and the stopper.

13. The grilling hoist as claimed in claim 9 comprising:

the drive system further comprising a housing, a drive receptacle, a motor, a mounting hole, and a hook;

the housing being pivotably attached to the carriage;

the drive receptacle normally traversing into the housing;
the motor being mounted within the drive receptacle;
the mounting hole normally traversing through the housing into the drive receptacle;
a linear end of the hook engaging into the mounting hole; and
the linear end being operatively coupled to the motor, wherein the motor rotates the hook.

14. The grilling hoist as claimed in claim 13 comprising:
the drive system further comprising a motor-support bracket;
the motor-support bracket being connected in between the motor and the housing.

15. The grilling hoist as claimed in claim 13 comprising:
the drive system further comprising an annular support bearing, a pinhole, and a lynchpin;
the annular support bearing being perimetrically mounted around the mounting hole;
the annular support bearing being positioned in between the housing and the motor;
the linear end being rotatably engaged through the annular support bearing;
the pinhole normally traversing through the linear end;
the lynchpin engaging into the pinhole; and
the lynchpin being positioned in between the annular support bearing and the motor.

16. The grilling hoist as claimed in claim 9 comprising:
a grilling cage;
a support cable;
the drive assembly further comprises a hook; and
the support cable being connected in between the grilling cage and the hook.

* * * * *